(12) United States Patent
Proctor, Jr.

(10) Patent No.: US 8,537,656 B2
(45) Date of Patent: Sep. 17, 2013

(54) METHOD FOR COMPENSATING FOR MULTI-PATH OF A CDMA REVERSE LINK UTILIZING AN ORTHOGONAL CHANNEL STRUCTURE

(75) Inventor: James A. Proctor, Jr., Melbourne Beach, FL (US)

(73) Assignee: IPR Licensing, Inc., Wilmington, DE (US)

(*) Notice: Subject to any disclaimer, the term of this patent is extended or adjusted under 35 U.S.C. 154(b) by 793 days.

(21) Appl. No.: 10/767,843

(22) Filed: Jan. 29, 2004

(65) Prior Publication Data

US 2004/0257975 A1  Dec. 23, 2004

Related U.S. Application Data

(63) Continuation-in-part of application No. 09/898,514, filed on Jul. 3, 2001, now Pat. No. 7,006,428.

(60) Provisional application No. 60/219,789, filed on Jul. 19, 2000.

(51) Int. Cl.
*H04J 11/00* (2006.01)

(52) U.S. Cl.
USPC .......................................... 370/203; 370/335

(58) Field of Classification Search
None
See application file for complete search history.

(56) References Cited

U.S. PATENT DOCUMENTS

| | | | |
|---|---|---|---|
| 4,460,992 A | | 7/1984 | Gutleber |
| 5,101,501 A | | 3/1992 | Gilhousen et al. |
| 5,103,459 A | | 4/1992 | Gilhousen et al. |
| 5,404,376 A | * | 4/1995 | Dent .............................. 375/138 |
| 5,414,728 A | | 5/1995 | Zehavi |
| 5,416,797 A | | 5/1995 | Gilhousen et al. |
| 5,617,410 A | | 4/1997 | Matsumoto |
| 5,870,427 A | | 2/1999 | Tiedemann, Jr. et al. |
| 5,930,244 A | | 7/1999 | Ariyoshi et al. |
| 5,937,019 A | | 8/1999 | Padovani |

(Continued)

FOREIGN PATENT DOCUMENTS

| | | |
|---|---|---|
| JP | 10-028077 | 1/1998 |
| JP | 2000-278759 | 10/2000 |

(Continued)

OTHER PUBLICATIONS

Nee Van R D J: "Timing Aspects of Synchronous CDMA" IEEE International Symposium on Personal, Indoor and Mobile Radio Communications, 1994, pp. 439-443, XP000619815, *p. 439-p. 440*.

Third Generation Partnership Project, "Technical Specification Group Radio Access Network; Medium Access Control (MAC) protocol specification (Release 5),"3GPP TS 25.321 V5.7.0 (Dec. 2003).

(Continued)

*Primary Examiner* — Kevin C Harper
*Assistant Examiner* — Rhonda Murphy
(74) *Attorney, Agent, or Firm* — Volpe and Koenig, P.C.

(57) ABSTRACT

A base station receives a reverse link signal from a given field unit that includes a common code (i.e., shared by other field units) and a unique orthogonal code (i.e., distinguishing the given field unit from other field units). The reverse link signal travels in a multi-path environment along a primary path and at least one secondary path. The base station makes a diversity decision based on the unique orthogonal code seen at two different phases. The base station determines a gross timing offset to align the common code of the given field unit with the common code from other field units using unique orthogonal codes. The given field unit makes a corresponding coarse adjustment of the phase of its common code.

15 Claims, 7 Drawing Sheets

(56) References Cited

U.S. PATENT DOCUMENTS

| | | | |
|---|---|---|---|
| 5,983,113 A | 11/1999 | Asanuma | |
| 6,044,074 A | 3/2000 | Zehavi et al. | |
| 6,085,108 A | 7/2000 | Knutsson et al. | |
| 6,091,760 A | 7/2000 | Giallorenzi et al. | |
| 6,094,421 A | 7/2000 | Scott | |
| 6,097,715 A | 8/2000 | Ichihara | |
| 6,144,651 A | 11/2000 | Rinchiuso et al. | |
| 6,240,292 B1 | 5/2001 | Haberman et al. | |
| 6,249,517 B1* | 6/2001 | Roh et al. | 370/342 |
| 6,266,363 B1 | 7/2001 | Hiramatsu | |
| 6,324,160 B1* | 11/2001 | Martin et al. | 370/209 |
| 6,324,401 B1 | 11/2001 | De Hoz Garcia-Bellido et al. | |
| 6,332,008 B1* | 12/2001 | Giallorenzi et al. | 375/356 |
| 6,377,814 B1 | 4/2002 | Bender | |
| 6,421,334 B1 | 7/2002 | Baines | |
| 6,438,377 B1 | 8/2002 | Savolainen | |
| 6,456,612 B1 | 9/2002 | Kim et al. | |
| 6,463,074 B1 | 10/2002 | Johnson et al. | |
| 6,470,001 B1 | 10/2002 | Kim et al. | |
| 6,529,741 B1 | 3/2003 | Tong et al. | |
| 6,563,808 B1 | 5/2003 | Cox et al. | |
| 6,590,889 B1* | 7/2003 | Preuss et al. | 370/342 |
| 6,665,287 B1 | 12/2003 | Katsura et al. | |
| 6,747,963 B1 | 6/2004 | Park et al. | |
| 6,917,581 B2 | 7/2005 | Proctor, Jr. et al. | |
| 7,006,428 B2 | 2/2006 | Proctor et al. | |
| 7,116,646 B1 | 10/2006 | Gustafson et al. | |
| 7,272,163 B2* | 9/2007 | Hao et al. | 375/141 |
| 2002/0009068 A1 | 1/2002 | Proctor, Jr. et al. | |
| 2002/0071384 A1* | 6/2002 | Hall et al. | 370/203 |
| 2002/0086693 A1 | 7/2002 | Ahmad et al. | |
| 2003/0002460 A1 | 1/2003 | English | |
| 2003/0128658 A1* | 7/2003 | Walton et al. | 370/208 |
| 2003/0214932 A1 | 11/2003 | Ariyoshi et al. | |
| 2004/0151141 A1 | 8/2004 | Proctor et al. | |
| 2004/0203991 A1 | 10/2004 | Chen et al. | |
| 2004/0257975 A1 | 12/2004 | Proctor | |
| 2005/0054366 A1 | 3/2005 | Chen et al. | |
| 2005/0220051 A1* | 10/2005 | Lavean | 370/330 |
| 2006/0140157 A1 | 6/2006 | Proctor et al. | |
| 2007/0076583 A1* | 4/2007 | Hadad | 370/203 |

FOREIGN PATENT DOCUMENTS

| | | |
|---|---|---|
| JP | 2000-286784 | 10/2000 |
| JP | 2001-016159 | 1/2001 |
| JP | 2001-358638 | 12/2001 |
| WO | 99/01999 | 1/1994 |
| WO | 99/01994 | 1/1999 |
| WO | 01/24411 | 5/2001 |
| WO | 01/95521 | 12/2001 |
| WO | 02/09320 | 1/2002 |
| WO | 2004/046893 | 6/2004 |

OTHER PUBLICATIONS

Nee Van R D J: "Timing Aspects of Synchronous CDMA" IEEE International Symposium on Personal, Indoor and Mobile Radio Communications, 1994, pp. 439-443, XP000619815, p. 439-p. 440.

Third Generation Partnership Project, "Technical Specification Group Radio Access Network; Medium Access Control (MAC) protocol specification (Release 4)," 3GPP TS 25.321 V4.9.0 (Sep. 2003).

Third Generation Partnership Project, "Technical Specification Group Radio Access Network; Medium Access Control (MAC) protocol specification (Release 5)," 3GPP TS 23.321 V5.7.0 (Dec. 2003).

Third Generation Partnership Project, "Technical Specification Group Radio Access Network; Medium Access Control (MAC) protocol specification (Release 6)," 3GPP TS 23.321 V6.0.0 (Dec. 2003).

Third Generation Partnership Project, "Technical Specification Group Radio Access Network; Packet Data Convergence Protocol (PDCP) Specification (Release 4)," 3GPP TS 25.232 V4.6.0 (Sep. 2002).

Chen, "Simultaneous Multiple Packet Capture Based on SIR Levels and Arrival Delay Offsets in CDMS Packet Networks," IEEE Transactions on Vehicular Technology, vol. 51, Issue 6 (Nov. 2002).

Cheun, "Optimum Arrival-Time Distribution for Delay Capture in Spread-Spectrum Packet Radio Networks," IEEE Transactions on Vehicular Technology, vol. 46, Issue 4 (Nov. 1997).

Ericsson, "Updated text proposal for TR 25.896: Fast DCH Setup Mechanisms," TSG-RAN WG1 #31, R1-030210 (Feb. 18-21, 2003).

LG Electronics Inc., "On consideration of synchronization indicator for reduction in uplink synchronization time in Fast DCH Setup," TSG-RAN WG1 #32, R1-030495 (May 19-23, 2003).

Nee Van R D J: "Timing Aspects of Synchronous CDMA" IEEE International Symposium on Personal, Indoor and Mobile Radio Communications, 1994, pp. 439-443, XP000619815, p. 439-p. 400.

Soft Handoff and Power Control in IS-95 CDMA; CDMA 95.10; Chapter 10; p. 181, (Dec. 6, 1999).

Third Generation Partnership Project, "Technical Specification Group Radio Access Network; Medium Access Control (MAC) protocol specification (Release 1999)," 3GPP TS 25.321 V3.16.0 (Sep. 2003).

Third Generation Partnership Project, "Technical Specification Group Radio Access Network; Medium Access Controll (MAC) protocol specification (Release 4)," 3GPP TS 25.321 V4.9.0 (Sep. 2003).

Third Generation Partnership Project, "Technical Specification Group Radio Access Network; Medium Access Control (MAC) protocol specification (Release 5)," 3GPP TS 25.321 V5.7.0 (Dec. 2003).

Third Generation Partnership Project, "Technical Specification Group Radio Access Network; Medium Access Control (MAC) protocol specification (Release 6)," 3GPP TS 25.321 V6.0.0 (Dec. 2003).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.5.0 (Sep. 2003).

Third Generation Partnership Project, "Technical Specification Group Radio Access Network; Physical channels and mapping of transport channels onto physical channels (FDD) (Release 6)," 3GPP TS 25.211 V6.0.0 (Dec. 2003).

Third Generation Partnership Project, "Technical Specification Group Radio Access Network; Spreading and modulation (FDD) (Release 1999)," 3GPP TS 25.213 V3.9.0 (Dec. 2003).

Third Generation Partnership Project, "Technical Specification Group Radio Access Network; Spreading and modulation (FDD) (Release 4)," 3G TS 25.213 V4.4.0 (Dec. 2003).

Third Generation Partnership Project, "Technical Specification Group Radio Access Network; Spreading and modulation (FDD) (Release 5)," 3GPP TS 25.213 V5.5.0 (Dec. 2003).

Third Generation Partnership Project, "Technical Specification Group Radio Access Network; Spreading and modulation (FDD) (Release 6)," 3GPP TS 25.213 V6.0.0 (Dec. 2003).

Third Generation Partnership Project, "Technical Specification Group Radio Access Network; Packet Data Convergence Protocol (PDCP) Specification (Release 4)," 3GPP TS 25.323 V4.6.0 (Sep. 2002).

Third Generation Partnership Project, "Technical Specification Group Radio Access Network; Packet Data Convergence Protocol (PDCP) Specification (Release 1999)," 3GPP TS 25.323 V3.10.0 (Sep. 2002).

Third Generation Partnership Project, "Technical Specification Group Radio Access Network; Packet Data Convergence Protocol (PDCP) Specification (Release 5)," 3GPP TS 25.323 V5.2.0 (Sep. 2002).

Third Generation Partnership Project, "Technical Specification Group Radio Access Network; Packet Data Convergence Protocol (PDCP) Specification (Release 6)," 3GPP TS 25.323 V6.0.0 (Dec. 2003).

Third Generation Partnership Project, "Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; Physical layer procedures (FDD) (Release 5)," 3GPP TS 25.214 V5.7.0 (Dec. 2003).

Third Generation Partnership Project, "Technical Specification Group Radio Access Network; Physical layer procedures (FDD) (Release 6)," 3GPP TS 25.214 V6.0.0 (Dec. 2003).

* cited by examiner

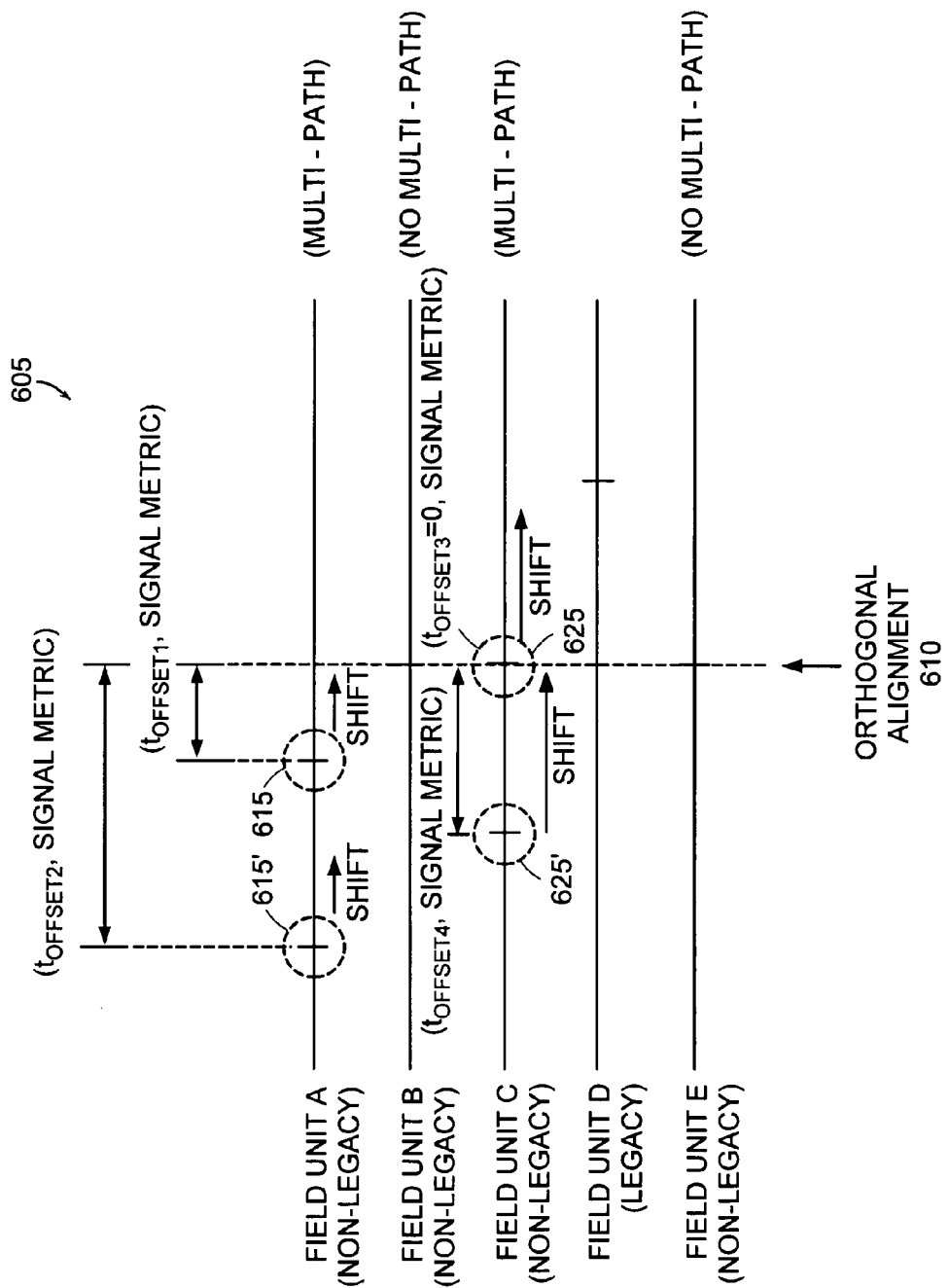

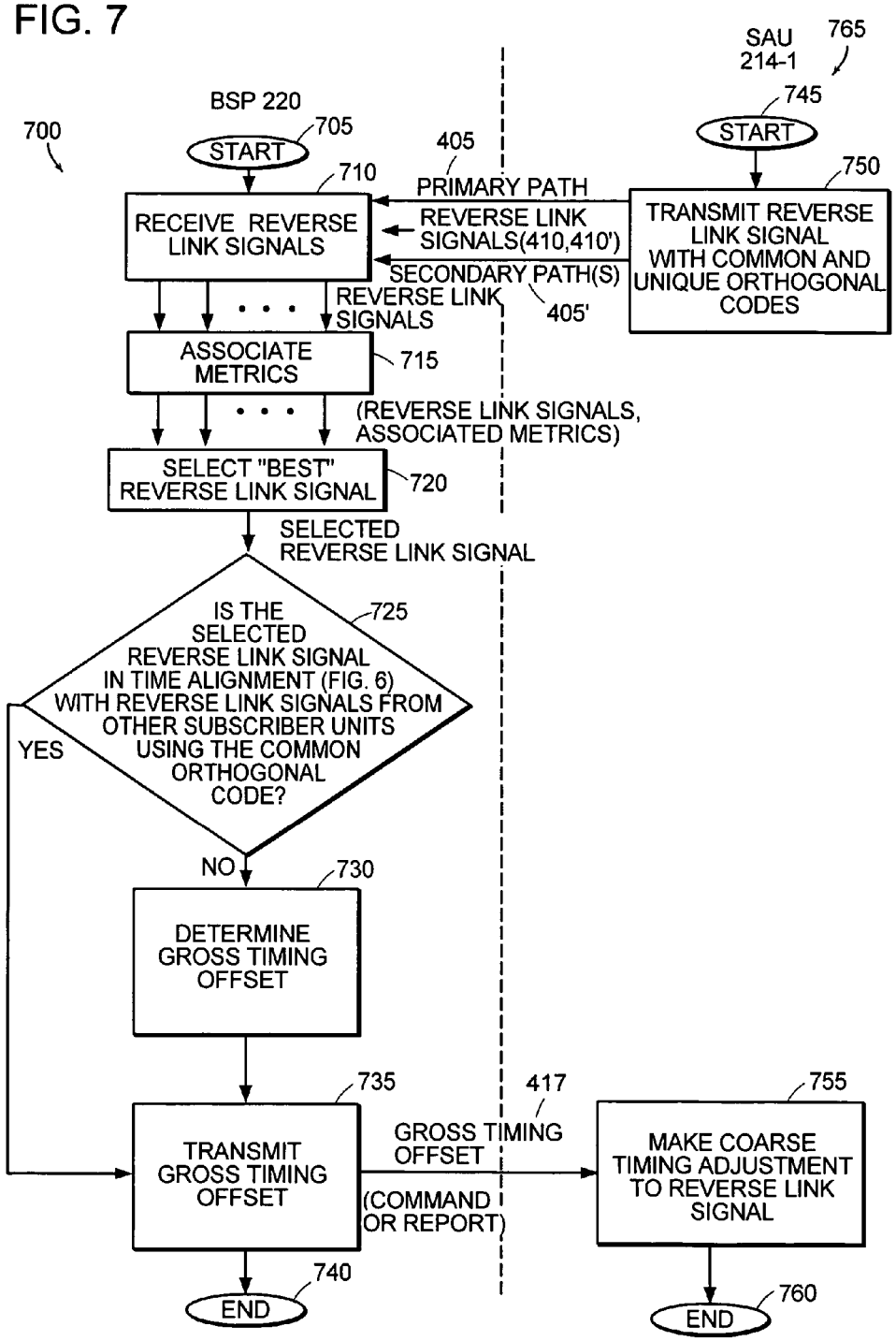

METHOD FOR COMPENSATING FOR MULTI-PATH OF A CDMA REVERSE LINK UTILIZING AN ORTHOGONAL CHANNEL STRUCTURE

RELATED APPLICATION(S)

This application is a Continuation-in-Part of U.S. application Ser. No. 09/898,514, filed Jul. 3, 2001, now U.S. Pat. No. 7,006,428 entitled "Method for Allowing Multi-User Orthogonal and Non-Orthogonal Interoperability of Code Channels," which claims priority to U.S. Provisional Application No. 60/219,789, filed Jul. 19, 2000 entitled "Method for Allowing Multi-User Orthogonal and Non-Orthogonal Interoperability of Code Channels on the Reverse Link of a CDMA System." The entire teachings of the above applications are incorporated herein by reference.

BACKGROUND OF THE INVENTION

The last twenty years have seen unprecedented growth in both the type and demand for wireless communication services. Wireless voice communication services, including cellular telephone, Personal Communication Services (PCS), and similar systems now provide nearly ubiquitous coverage. The infrastructure for such networks has been built-out to the point where most residents of the United States, Europe, and other industrialized regions of the world have not just one, but multiple service providers from which to choose.

Continued growth in the electronics and computer industries increasingly contributes to demand for access to the Internet and the myriad of services and features that it provides. This proliferation in the use of computing equipment, especially that of the portable variety, including laptop computers, handheld Personal Digital Assistants (PDAs), Internet-enabled cellular telephones and like devices, has resulted in a corresponding increase in the need for wireless data access.

While the cellular telephone and PCS networks are widely deployed, these systems were not originally intended for carrying data traffic. Instead, these networks were designed to efficiently support continuous analog signals as compared to the burst mode digital communication protocols needed for Internet communications. Consider also that voice communication is adequate with a communication channel bandwidth of approximately 3 kilohertz (kHz). However, it is generally accepted that for effective Internet communication, such as for Web browsing, a data rate of at least 56 kilobits per second (kbps) or higher is required.

In addition, the very nature of the data traffic itself is different from the nature of voice communication. Voice requires a continuous full duplex connection; that is, the user at one end of a connection expects to be able to transmit and receive to the user at the other end of a connection continuously, while at the same time the user at the other end is also able to transmit and receive. However, access to Web pages over the Internet is, in general, very burst oriented. Typically, the user of a remote client computer specifies the address of computer files such as on a Web server. This request is then formatted as a relatively short data message, typically less than a 1000 bytes in length. The other end of the connection, such as at a Web server in the network, then replies with the requested data file which may be from 10 kilobytes to several megabytes of text, image, audio, video data, or combinations thereof. Because of delays inherent in the Internet itself, users often expect delays of at least several seconds or more before the requested content begins to be delivered to them. And then once that content is delivered, the user may spend several seconds or even minutes reviewing, reading the contents of the page before specifying the next page to be downloaded.

Furthermore, voice networks were built to support high mobility usage; that is, extreme lengths were taken to support highway speed type mobility to maintain connections as the users of voice based cellular and PCS networks travel at high speeds along a highway. However, the typical user of a laptop computer is relatively stationary, such as sitting at a desk. Thus, the cell-to-cell and intra-cell high speed mobility considered critical for wireless voice networks is typically not required for supporting data access.

SUMMARY OF THE INVENTION

It would make sense to retrofit certain components of the existing wireless infrastructure to more efficiently accommodate wireless data. The additional functionality implemented for a new class of users who are high data rate but low mobility users should be backwards compatible with existing functionality for users who are low data rate, high mobility. This would permit using the same frequency allocation plans, base station antenna, build out sites, and other aspects of the existing voice network infrastructure to be used to provide the new high speed data service.

It would be particularly important to support as high a data rate as possible on the reverse link of such a network that is carrying data on the reverse link, e.g., from the remote unit to the base station. Consider that existing digital cellular standards such as the IS-95 Code Division Multiple Access (CDMA) specify the use of different code sequences in a forward link direction in order to maintain minimum interference between channels. Specifically, such a system employs orthogonal codes on the forward link, which define individual logical channels. However, the optimum operation of such a system requires all such codes to be time aligned to a specific boundary to maintain orthogonality at the receiver. Therefore, the transmissions must be synchronized.

This is not a particular concern in a forward link direction since all transmissions originate at the same location, i.e., at a base transceiver station location. However, currently, digital cellular CDMA standards do not attempt to use or require orthogonality between channels in a reverse link direction. It is generally assumed that it is too difficult to synchronize transmissions originating from remote units located in different locations and at potentially quite different distances from the base station. Instead, these systems typically use a chip level scrambling code with unique shifts of this long pseudo-random code to distinguish the individual reverse link channels. Use of this scrambling, however, thus precludes the possibility of different users' transmissions being orthogonal to one another.

Accordingly, one embodiment of the present invention includes a system that supports communication among members of a first group of users and a second group of users. The first group of users, which may be legacy users of a digital Code Division Multiple Access (CDMA) cellular telephone system, encode their transmissions with a common first code. Such first group of users are uniquely identifiable by providing a unique code phase offset for each user. The second group of users, who may be users of a high speed data service, encode their transmissions using the same code and share one of the code phase offsets of that code. However, each of the users of the second group further encode their transmissions with an additional code, the additional code being unique for each of the users of the second group. This permits the transmissions of the second group of users to be orthogonal to each other while still maintaining the appearance of collectively being a single user of the first group.

The code assigned to the first group of users may be a common chipping rate, pseudorandom code. The codes assigned to the second group of terminals may typically be a set of unique orthogonal codes. The individual members of the first group of terminals may be distinguished by scrambling codes that have unique phase offsets of a selected longer pseudorandom noise sequence.

In a preferred embodiment, certain steps are taken to ensure proper operation of the signaling among the second group of users or so-called "heartbeat." Specifically, a common code channel may be dedicated for use as a synchronization channel. This permits the maintenance of proper timing of the transmissions of the second group of terminals if, for example, the coding scheme is implemented in a reverse link direction.

In another embodiment, the users of the second group may be allocated specific time slots in which to transmit and therefore maintain the orthogonality through the use of time division multiple access. Again, the point is that the users of the second group collectively appear as a single user to the transmissions of the users in the first group.

Because of the orthogonal signaling, the principles of the present invention allow a CDMA system with just one antenna in a multi-path environment to make a diversity decision since the unique orthogonal code can be seen at two or more different phases. In a preferred embodiment, for a signal received at multiple phases from a given field unit in the second group in a multi-path environment, a base station makes the diversity decision by selecting a "best" reverse link signal at one of the phases. The reverse link signal at the selected phase is orthogonally aligned with the reverse link signals of other field units in the selected group. The orthogonally aligned reverse link signal may be referred to herein as the orthogonal link, and the reverse link signal(s) at a phase not orthogonally aligned with signals of other field units in the second group may be referred to herein as a non-orthogonal link.

Since an orthogonal link must be time aligned to maintain orthogonality from one user to the next, a timing control loop is employed from the base station to keep the reverse link signal at the selected phase orthogonally aligned with the reverse link signals of the other field units in the second group.

Existing CDMA systems define reverse-link channelizations non-orthogonally. This is performed by defining unique spreading code shifts for each reverse-link user. Orthogonal and non-orthogonal backward compatibility can be achieved by orthogonal users for a primary base station sharing the same spreading code. When these user signals are received at other base stations, it is unlikely that they will be time aligned, but they will all have unique code shifts and be able to be uniquely identified based on the combination of code shift and orthogonal code.

When the diversity selection takes place and the code phase of the reverse link signal is shifted, there may be a significant code phase offset. Using a conventional one-bit differential timing control loop may be too slow to obtain orthogonality quickly with reverse link signals from other field units. Therefore, when the diversity selection occurs, a gross timing adjustment command or message may be used to re-align the reverse link rapidly. The gross timing adjustment may be an absolute or relative value. In the case of the timing command, the field unit is told to make a coarse timing adjustment; in the case of the timing message, the subscriber unit autonomously responds to information in the timing message.

The criteria for timing control selection (i.e., diversity selection) may be based on criteria, including at least one of the following:

1. The metric of an alternative path exceeds a threshold for a designated period of time;
2. The metric of a secondary (i.e., unselected) path exceeds a threshold relative to the current path for a designated period of time;
3. The primary (i.e., currently selected) path drops below an absolute metric; or
4. The secondary path exceeds an absolute metric,
   where the metric may be one or more of the following:
   a. Power;
   b. SNR;
   c. Variance of the power;
   d. Variance of the SNR; or
   e. Relative ratio of the above metrics between the primary path and secondary path.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a timing diagram of reverse link signals received at the base transceiver station of FIG. 4; and FIG. 7 is a flow diagram of processes that may be executed by the base transceiver station and access terminal of FIG. 4.

DETAILED DESCRIPTION OF THE INVENTION

A description of preferred embodiments of the invention follows.

Figure 1:
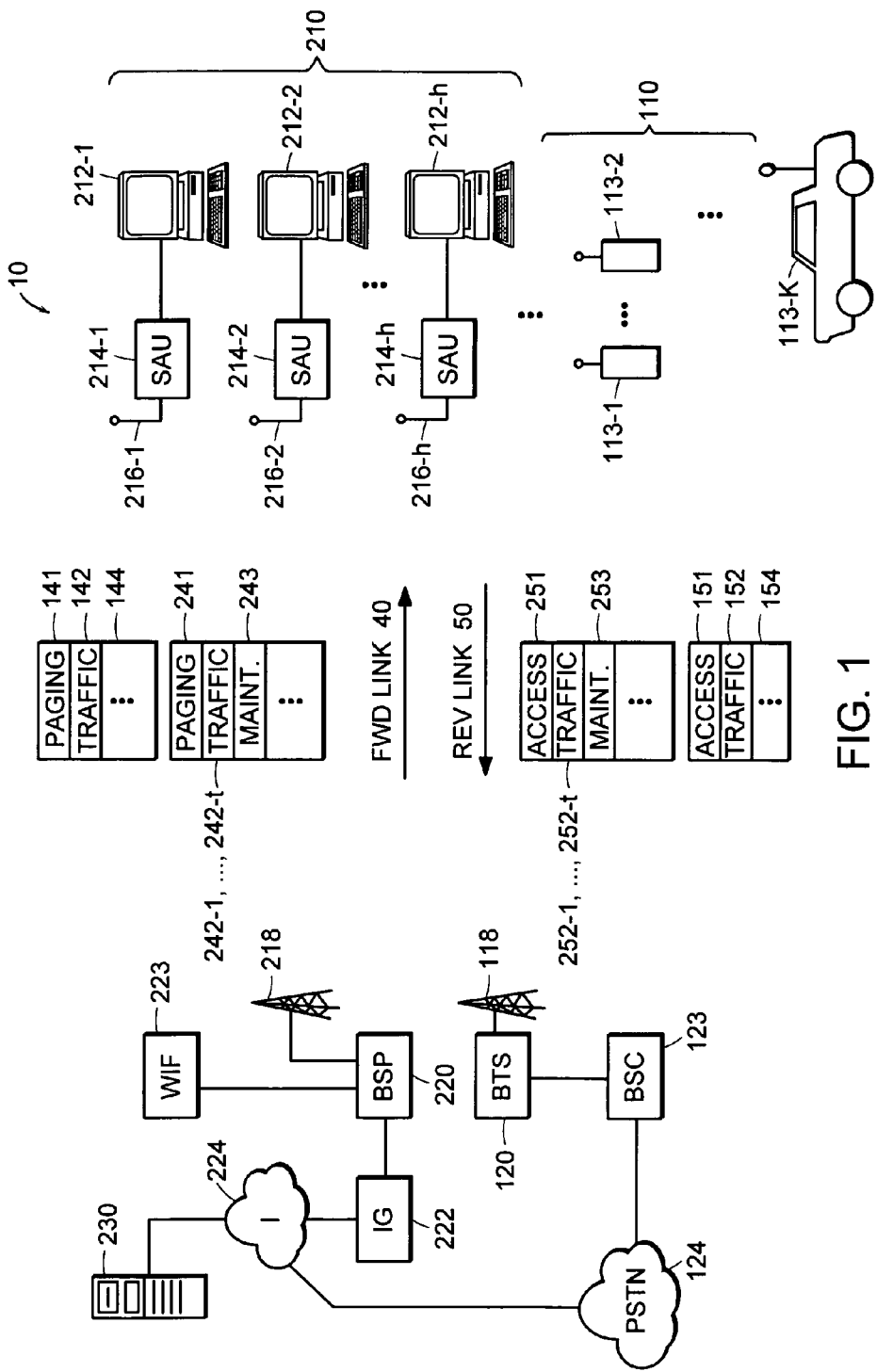
FIG. 1 is a block diagram of a wireless communications system supporting orthogonal and non-orthogonal reverse links.

FIG. 1 is a block diagram of a Code Division Multiple Access (CDMA) communications system 10 that makes use of a signal encoding scheme in which a first class of logical channels are assigned unique long codes with different code phase offsets, and a second class of logical channels are provided by using a common long code and common code phase offset, combined with an additional coding process using a unique orthogonal code for each channel.

In the following detailed description of a preferred embodiment, the communications system 10 is described such that the shared channel resource is a wireless or radio channel. However, it should be understood that the techniques described here can be applied to implement shared access to other types of media such as telephone connections, computer network connections, cable connections, and other physical media to which access is granted on a demand driven basis.

The system 10 supports wireless communication for a first group of users 110 as well as a second group of users 210. The first group of users 110 are typically legacy users of cellular telephone equipment such as wireless handsets 113-1, 113-2, and/or cellular mobile telephones 113-h installed in vehicles. This first group of users 110 principally use the network in a voice mode whereby their communications are encoded as continuous transmissions. In a preferred embodiment, these users' transmissions are forwarded from the subscriber units 113 through forward link 40 radio channels and reverse link 50 radio channels. Their signals are managed at a central location that includes a base station antenna 118, Base Transceiver Station (BTS) 120, Base Station Controller (BSC) 123. The first group of users 110 are therefore typically engaged in voice conversations using the mobile subscriber units 113, BTS 120, and BSC 123 to connect telephone connections through the Public Switched Telephone Network (PSTN) 124.

The forward link 40 in use by the first group of users may be encoded according to well known digital cellular standards, such as a Code Division Multiple Access (CDMA) standard defined in IS-95B specified by the Telecommunications Industry Association (TIA). This forward link 40 includes at least a paging channel 141 and a traffic channel 142, as well as other logical channels 144. These forward link 40 legacy channels 141, 142, 144 are defined in such a system by using orthogonally coded channels. This first group of users 110 also encode their transmissions over the reverse link 50 in accordance with the IS-95B standard. They therefore make use of several logical channels in a reverse link 50 direction, including an access channel 151, traffic channel 152, and other logical channels 154. In this reverse link 50, the first group of users 110 typically encode the signals with a common long code using different code phase offsets. The manner of encoding signals for the legacy users 110 on the reverse link 50 is also well known in the art.

The communications system 10 also includes a second group of users 210. This second group of users 210 are typically users who require high speed wireless data services. Their system components include a number of remotely located Personal Computer (PC) devices 212-1, 212-2, ... 212-h corresponding remote Subscriber Access Units (SAUs) 214-1, 214-2, ... 214-h, and associated antennas 216-1, 216-2, ... 216-h. Centrally located equipment includes a base station antenna 218 and a Base Station Processor (BSP) 220. The BSP 220 provides connections to and from an Internet gateway 222, which in turn provides access to a data network, such as the Internet 224 and network file server 230 connected to the network 222. It should be understood that the BTS 120 may be retrofitted to operate in the same manner as the BSP 220 and provide similar connections to and from an Internet gateway 222. Thus, in some embodiments, the SAUs 214 may communicate with the BSP 220 or BTS 120 in the forward link 40 and reverse link 50.

The PCs 212 may transmit data to and receive data from network server 230 through bi-directional wireless connections implemented over the forward link 40 and reverse link 50 used by the legacy users 110. It should be understood that in a point to multi-point multiple access wireless communication system 10 as shown, a given base station processor 220 supports communication with a number of different active subscriber access units 214 in a manner that is similar to a cellular telephone communication network.

In the present scenario, the radio frequencies allocated for use by the first group 110 are the same as those allocated for use by the second group 210. One aspect of the present invention is specifically concerned with how to permit a different encoding structure to be used by the second group 210 while creating minimal interference to the first group 110.

The PCs 212 are typically laptop computers 212-1, handheld units 212-h, Internet-enabled cellular telephones or Personal Digital Assistant (PDA) type computing devices. The PCs 212 are each connected to a respective SAU 214 through a suitable wired connection such as an Ethernet-type connection.

An SAU 214 permits its associated PC 212 to be connected to the network file server 230 through the BSP 220, Internet Gateway (IG) 222, and network 224. In the reverse link direction, that is, for data traffic traveling from the PC 212 towards the server 230, the PC 212 provides an Internet Protocol (IP) level packet to the SAU 214. The SAU 214 then encapsulates the wired framing (i.e., Ethernet framing) with appropriate wireless connection framing and encoding. The appropriately formatted wireless data packet then travels over one of the radio channels that comprise the reverse link 50 through the antennas 216 and 218. At the central base station location, the BSP 220 then extracts the radio link framing, reformatting the packet in IP form, and forwards it through the Internet gateway 222. The packet is then routed through any number and/or any type of TCP/IP networks, such as the Internet 224, to its ultimate destination, such as the network file server 230.

Data may also be transmitted from the network file server 230 to the PCs 212 in a forward link 40 direction. In this instance, an Internet Protocol (IP) packet originating at the file server 230 travels through the Internet 224 through the Internet gateway 222 arriving at the BSP 220. Appropriate wireless protocol framing and encoding is then added to the IP packet. The packet then travels through the antenna 218 and 216 to the intended receiver SAU 214. The receiving SAU 214 decodes the wireless packet formatting, and forwards the packet to the intended PC 212, which performs the IP layer processing.

A given PC 212 and the file server 230 can therefore be viewed as the end points of a duplex connection at the IP level. Once a connection is established, a user at the PC 212 may thereafter transmit data to and receive data from the file server 230.

From the perspective of the second group of users 210, the reverse link 50 actually consists of a number of different types of logical and/or physical radio channels including an access channel 251, multiple traffic channels 252-1, ... 252-t, and a maintenance channel 53. The reverse link access channel 251 is used by the SAUs 214 to send messages to the BSP 220 to request that traffic channels be granted to them. The assigned traffic channels 252 then carry payload data from the SAU 214 to the BSP 220. It should be understood that a given IP layer connection may actually have more than one traffic channel 252 assigned to it. In addition, a maintenance channel 253 may carry information such as synchronization and power control messages to further support transmission of information over the reverse link 50.

Similarly, the second group of users 210 have a forward link 40 that includes a paging channel 241, multiple traffic channels 242-1 ... 242-t, and maintenance channel 243. The paging channel 241 is used by the BSP 220 to not only inform the SAU 214 that forward link traffic channels 252 have been allocated to it, but also to inform the SAU 214 of allocated traffic channels 252 in the reverse link direction. In an alternative embodiment, the BSP 220 does not mandate the allocated traffic channels 252 in the reverse link direction; for example, a slotted aloha technique may be used. Traffic channels 242-1 ... 242-t on the forward link 40 are then used to carry payload data information from the BSP 220 to the SAUs 214. Additionally, maintenance channels 243 carry synchronization and power control information on the forward link 40 from the base station processor 220 to the SAUs 214.

It should be understood that there are typically many more traffic channels 242 than paging channels 241 or maintenance channels 243. In the preferred embodiment, the logical forward link channels 241, 242, and 243 and logical reverse link channels 251, 252, and 253 are defined by assigning each channel a pseudorandom noise (PN) channel code. The system 10 is therefore a so-called Code Division Multiple Access (CDMA) system in which multiple coded channels may use the same radio frequency (RF) channel. The logical or code channels may also be further divided or assigned among multiple active SAUs 214.

The sequence of signal processing operations is typically performed to encode the respective reverse link 50 logical channels 251, 252, and 253. In the reverse link direction, the transmitter is one of the SAUs 214, and the receiver is the Base Station Processor (BSP) 220. The preferred embodiment of the present invention is implemented in an environment where legacy users of a CDMA digital cellular telephone system, such as one operating in accordance with the IS-95B standard, are also present on the reverse link 50. In an IS-95B system, reverse link CDMA channel signals are identified by assigning non-orthogonal pseudorandom noise (PN) codes.

Figure 2:
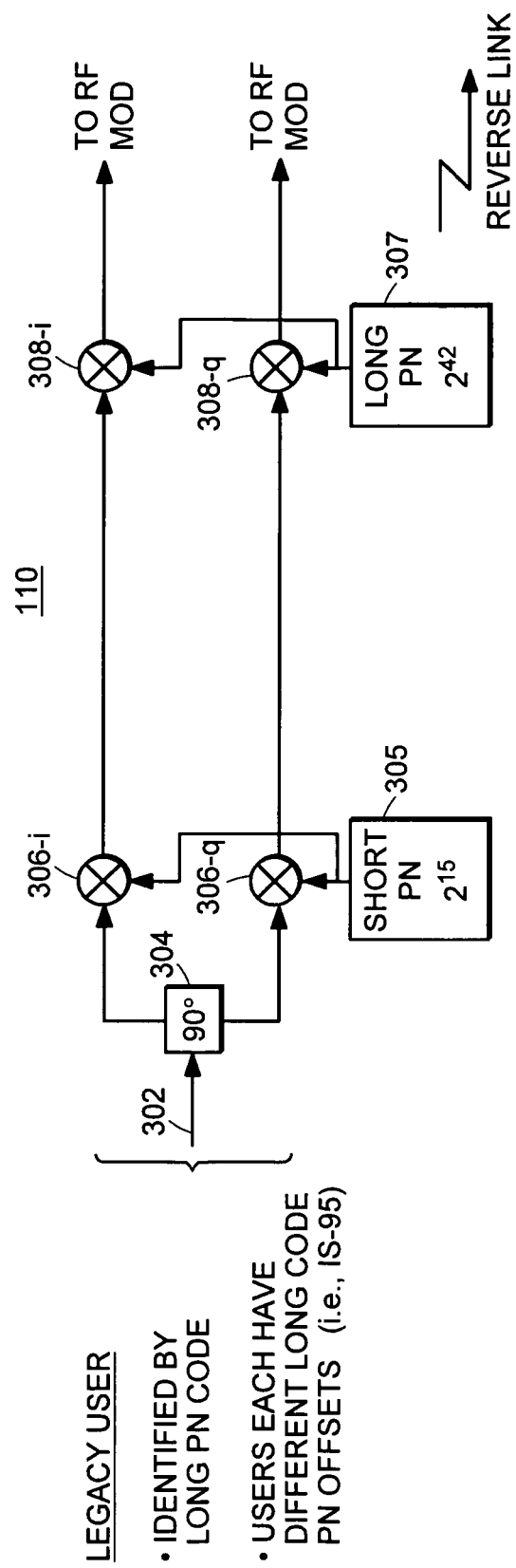
FIG. 2 is a block diagram of a circuit employed by the access terminal of FIG. 1.

Turning attention now to FIG. 2, the channel encoding process for the first group of legacy users 110 will be described in greater detail. This first class of users includes, for example, digital CDMA cellular telephone system users that encode signals according to the IS-95B standard as mentioned above. The individual channels are therefore identified by modulating the input digitized voice signal by a pseudorandom noise (PN) code sequence for each channel. Specifically, the channel encoding process takes an input digital signal 302 that represents the information to be transmitted. A quadrature modulator 304 provides an in-phase (i) and quadrature (q) signal path to a pair of multipliers 306-i and 306-q. A short pseudorandom noise (PN) code generator 305 provides a short (in this case a $2^{15-1}$ or 32767 bit) length code used for spectrum spreading purposes. The short code typically therefore is the same code for each of the logical channels for the first group 110.

A second code modulation step is applied to the (i) and (q) signal paths by multiplying the two signal paths with an additional long PN code. This is accomplished by the long code generator 307 and the long code multipliers 308-i and 308-q. The long code serves to uniquely identify each user on the reverse link 50. The long code may be a very long code, which, for example, only repeats every $2^{42-1}$ bits. The long code is applied at the short code chipping rate, e.g., one bit of the long code is applied to each bit output by the short code modulation process, so that further spectrum spreading does not occur.

Individual users are identified by applying different phase offsets of the PN long code to each user.

It should be understood that other synchronization steps need not be taken for the first group of users 110. Specifically, these transmissions on the reverse link 50 are designed to be asynchronous and therefore are not necessarily perfectly orthogonal.

Figure 3:
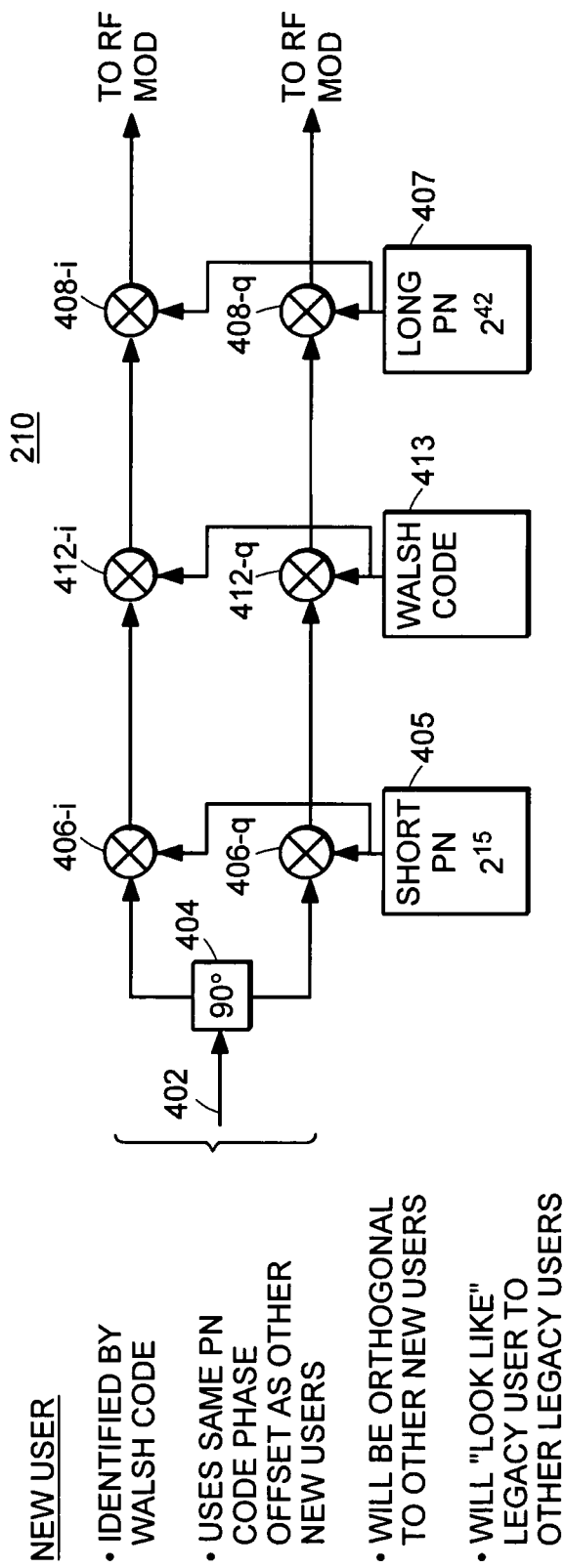
FIG. 3 is a block diagram of the circuit of FIG. 2 further including a code generator to operate on an orthogonal reverse link with other access terminals.

FIG. 3 is a more detailed view of the channel encoding process for the second group of users 210. This second group 210, for example, includes wireless data users that encode signals according to a format optimized for data transmission.

The individual channels are identified by modulating the input data by a pseudorandom noise (PN) code sequence that is the same code sequence used for the first group of users 110. However, as will be understood shortly, the channels in the second group 210 are uniquely identified by specific orthogonal codes such as Walsh codes. Specifically, the channel encoding process for this second group of users 210 takes an input digital signal 402 and applies a number of codes as generated by a short code generator 405, Walsh code generator 413, and long code generator 407.

As a first step, a quadrature modulator 404 provides an in-phase (i) and quadrature (q) signal path to a first pair of multipliers 406-i and 406-q. The short pseudorandom noise (PN) code generator 405 provides a short, in this case, a $2^{15}$ length code used for spectrum spreading purposes. This short code therefore is the same as the short PN code used for each of the channels in the first group 110.

A second step in the process is to apply an orthogonal code such as generated by the Walsh code generator 413. This is accomplished by the multipliers 412-i and 412-q impressing the orthogonal code on each of the in-phase and quadrature signal paths. The orthogonal code assigned to each logical channel is different, and uniquely identifies such channels.

In a final step of the process, a second pseudorandom noise (PN) long code is applied to the (i) and (q) signal paths. The long code generator 407 thus forwards the long code to a respective one of the in-phase 408-i and quadrature 408-q multipliers. This long code does not uniquely identify each user in the second group 210. Specifically, this code may be one of the very same long codes that are used in the first group that uniquely identify the first group of users 110. Thus, for example, it is applied in the same manner as a short code chipping rate code so that one bit of the long code is applied to each bit output by the short code modulation process. In this manner, all of the users in the second group 210 appears as a single legacy user of the first group 110. However, the users of the second group 210 may be uniquely identified given that they have been assigned unique orthogonal Walsh codes.

As the implementation in the preferred embodiment is on a reverse link 50, additional information must be fed back in order to maintain orthogonality among the various users in the second group 210. Specifically, a maintenance channel 243 is therefore included in the forward link 40. A maintenance channel or "heartbeat" channel 253 also exists on the reverse link 50 and provides synchronization information and/or other timing signals so that the remote units 214 may synchronize their transmissions appropriately. The maintenance channel may be time slotted. For more details of the formatting of this reverse link maintenance channel 253, reference can be made to a co-pending U.S. patent application Ser. No. 09/775,305 filed Feb. 1, 2001 entitled "MAINTENANCE LINK USING ACTIVE/STANDBY REQUEST CHANNELS," which is hereby incorporated by reference in its entirety. In particular, the maintenance channel maintains a minimal maintenance link between each of multiple field units and a base station even when they are not presently transmitting a data payload in a reverse link direction. If it is determined that the field unit is inactive too long, i.e., in standby mode not transmitting data, the base station maintains an idle connection with the field unit.

It should be understood that certain infrastructure may therefore be shared by both the second group of users 210 and first group of users 110. For example, the antennas 218 and 118 although shown as separate base station antennas in FIG. 1 may indeed be a shared antenna. Likewise, the location for the antennas may therefore be the same. This permits the second group of users 210 to share equipment and physical build-out locations already in place and in use by the legacy users 110. This greatly simplifies the deployment of wireless infrastructure for this new group of users 210, for example, new locations and new antenna sites need not be built out.

The BTS 120, BSP 220, BSC 123 or other network device in communication with the BTS 120 and BSP 220 may coordinate the phase offsets of the long codes that are available for use by the BSP 220. The phase offsets available for a non-legacy user are from a set allocated to and/or by the BTS 120, but they are not used by a BTS legacy user 110.

The BTS 120 and BSP 220 may coordinate (i.e., synchronize) timing of the BTS 120 and BSP 220 forward links (i) through direct communication with one another via a communications link (not shown), (ii) in response to input from the BSC 123, or (iii) through indirect communication via the networks 124, 224. Synchronization is useful in time aligning the reverse links 50 and in ensuring proper transfer of legacy and non-legacy users 110, 210 occurs when moving from the BTS 120 to the BSP 220, and vice-versa.

In addition, power control of reverse link signals from the legacy users 113 and SAUs 214 may be controlled using various techniques. For example, both the BTS 120 and BSP 220 may issue power commands or messages to the users 110, 210. The SAUs 214 and subscriber units 113, for example, may (i) increase the power of their respective reverse link signals by the smaller amount if both the BTS 120 and BSP 220 indicate power should be increased and (ii) decrease the power of their reverse link signals by the larger amount (i.e., more negative value) if both the BTS 120 and BSP 220 indicate lowering power. If one indicates raising the power and one indicates lowering the power, the affected SAU 214 lowers its power in this example. Alternative power control techniques of reverse link signals may be employed.

Figure 4:
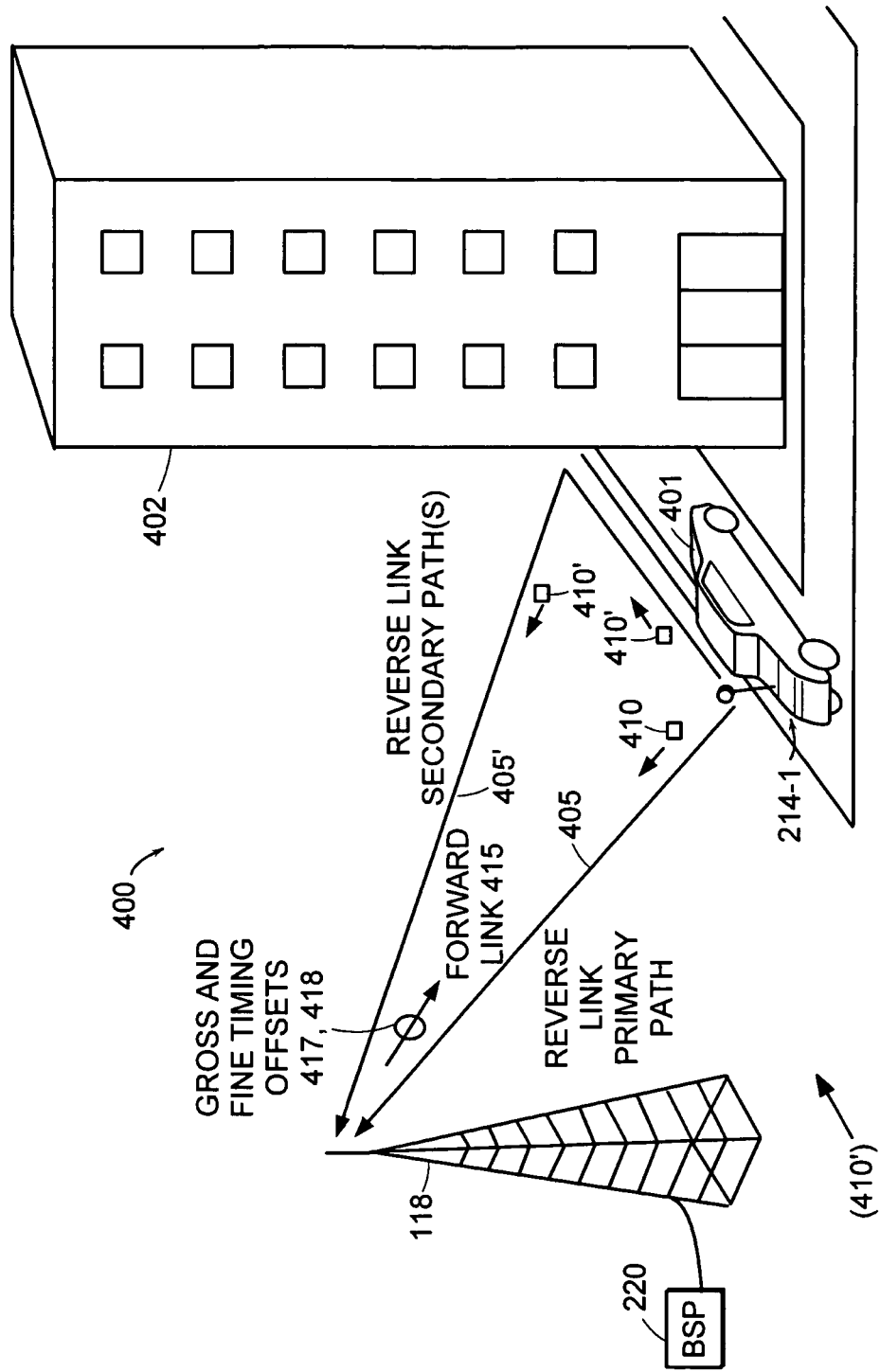
FIG. 4 is a block diagram of an environment in which a base station of FIG. 1 controls the timing of the orthogonal reverse link signal in the presence of multi-path.

FIG. 4 is a diagram of a multiple path (i.e., "multi-path") environment 400 in which one of the users in the second group is communicating with the base transceiver station 120. In this example, the user employs the subscriber access unit (SAU) 214-1, which is deployed in an automobile 401, to communicate in the reverse link with the BSP 220 via the antenna tower 118. In this diagram, the reverse link signal takes multiple paths 405, 405' (collectively 405) between the SAU 214-1 and the BPS 220 due to transmission in a multi-path environment 400. In this example, the multi-path environment 400 is caused by a man-made structure 402 (i.e., a building) that has an electro-magnetic property of reflecting RF transmissions. The multi-paths 405 are referred to as a reverse link primary path 405 and reverse link secondary path(s) 405'. As a result of the two or more paths, a like number of reverse link signals 410, 410' (collectively 410) having a common long orthogonal code and unique orthogonal code, such as a Walsh code (or other suitable, orthogonal code described in reference to FIG. 3), are received at the BSP 220.

Because the two reverse link signals 410, 410' are received at the BPS 220 with the same unique orthogonal code, the BSP 220 has an opportunity to perform diversity selection of the reverse link signals 410, 410'. The BSP 220 may select the reverse link signal 410, 410' having, for example, the highest Signal-to-Noise Ratio (SNR) to maximize reverse link communications performance between the subscriber unit 214-1 and the BSP 220. Other metrics may be used to select the "best" reverse link signal from the subscriber unit 214-1.

After selecting the "best" reverse link signal, the BSP 220 determines a gross timing offset of the selected reverse link signal 410 based on its timing offset from the reverse link signals of other subscriber units 214-2, . . . , 214-*h* in the second group 210 (FIG. 1) with which the selected reverse link signal 410 is to be orthogonally aligned. The BSP 220 transmits the gross timing offset to the SAU 214-1 in the forward link 415 to align the selected reverse link signal 410 with the reverse link signals from the other subscriber units 214-2, . . . , 214-*h*. Fine timing offsets are also transmitted in the forward link 415. The gross and fine timing offset feedback may be transmitted to the subscriber unit 214-1 in the form of a timing command or timing report.

In the case of a timing report, the subscriber unit 214-1 autonomously shifts the phase of the long code (i.e., orthogonal code common to long codes used by other subscriber units in the group) so as to be orthogonally aligned with the long codes of the other subscriber units, thereby making the second group of users 210 appear as a single user to the first group of users 110.

The BSP 220 may also determine a power level of the selected reverse link signal and provide feedback of the power level to the subscriber unit 214-1, either in the form of a command or report. The BSP 220 may determine whether the SNR of the selected reverse link signal meets a quality criterion. The quality criterion may include at least one of the following: (a) the metric of the secondary path (or alternative or candidate) exceeds a threshold for a predetermined time span, (b) the metric of the secondary path exceeds a threshold relative to the primary path for a predetermined time span, (c) the metric of the primary path drops below an absolute metric, and (d) the metric of the secondary path exceeds an absolute metric. The metrics may include at least one of the following: (a) power, (b) SNR, (c) variance of the power, (d) variance of the SNR, (e) relative ratio of the power, SNR, or variance of two paths, (f) bit error rate, and (g) energy per chip divided by the interference density (Ec/Io). An alternative path is represented as the reverse link signal received by a receiver in the base transceiver station at a different phase from the reverse link signal at a phase orthogonally aligned (i.e., current path) with reverse link signals of other field units in the same group.

The power level feedback may cause the subscriber unit 214-1 to adjust the power level of the coded signal in response to the feedback. For example when (i) the SNR of the selected path does not meet the quality criterion or (ii) the SNR of a non-selected path meets a quality criterion, the BTS 120 may cause the timing of the reverse link signal to shift, through use of gross and fine timing offsets, to cause the phase of the long code in the subscriber unit to shift. The phase shift of the long code causes the "best" reverse link signal to be time aligned with reverse link signals from other subscriber units using the same long codes.

Figure 5:
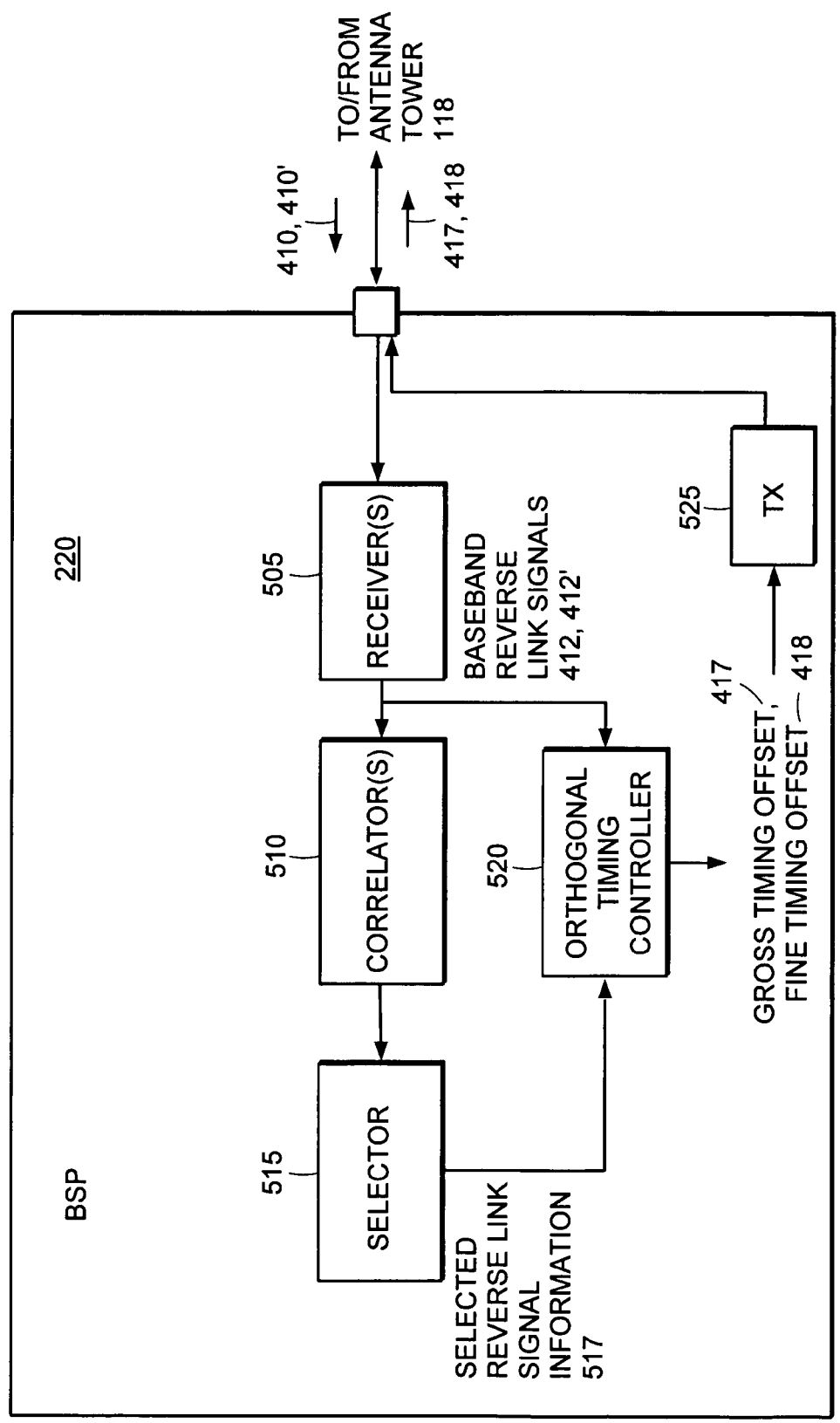
FIG. 5 is a block diagram of a Base Transceiver. Station (BTS) of FIG. 1.

FIG. 5 is a block diagram of the BSP 220 and an example of processing units 505-520 that may be used by the BTS 120 to determine a gross timing offset 417. The processing units include receiver(s) 505, correlator(s) 510, selector 515, and orthogonal timing controller 520.

In operation in the multi-path environment 400, the BSP 220 receives multi-path reverse link signals 410, 410' from the antenna tower 118 at receiver(s) 505. The receiver(s) 505 receive the multi-path reverse link signals 410, 410', which include the same common code and unique orthogonal codes, that travel on the primary path 405 and at least one secondary path 405' from the subscriber unit 214-1 to the BSP 220.

The receiver(s) 505 output a like number of reverse link signals (i.e., corresponding to the number of reverse link paths 405, 405' in the multi-path environment 400) that each include the common long codes and unique orthogonal codes. After being processed by the receiver(s) 505, each of the received reverse link signals 410, 410' are sent to the correlator(s) 510 and orthogonal timing controller 520 in the form of baseband signals 412, 412'. The correlator(s) 510 associate a metric with data of each of the received reverse link signals 410, 410'. The correlator(s) 510 send the metric and reverse link signal data to the selector 515 for selecting the reverse link signal 410, 410' associated with the best metric. In other words, the reverse link signal 410, 410' that provides the best signal for reverse link communications is selected to be orthogonally aligned with the reverse link signals from the other subscriber units 214-2, . . . , 214-*h* in the second group 210.

The selector 515 sends information 517 corresponding to the selected reverse link signal to the orthogonal timing controller 520. Based on the information 517, the orthogonal timing controller 520 performs processing on the corresponding (i.e., "best") reverse link signal and determines gross and fine timing offset(s) 417 and 418. The controller 520 determines the offset(s) 417, 418 based on the timing of the selected reverse link signal with respect to the timing of reverse link signals from the other subscriber units 214-2, . . . , 214-*h* using the same long code, as discussed in reference to FIG. 3.

Continuing to refer to FIG. 5, the gross and fine timing offsets 417, 418 are sent to a transmitter (Tx) 525. The transmitter 525 transmits the gross and fine timing offsets 417, 418 to the subscriber access unit 214-1 on the forward link 415, as discussed in reference to FIG. 4. It should be understood that the orthogonal timing controller 520 may issue gross and fine timing offsets 417, 418 for sending to the subscriber unit 214-1 by first sending the gross timing offset 417 then, after the reverse link signal has been shifted sufficiently close in orthogonal alignment with the reverse link signals from the other subscriber units 214-2, . . . , 214-*h*, the orthogonal timing controller 520 determines fine timing offsets 418.

FIG. 6 is a timing diagram 605 illustrating the timing of the multiple reverse link signals 410, 410' received from five field units A-E in the case of a multi-path environment 400. The timing diagram 605 includes signals, represented by vertical tick marks, for a set of the five field units A-E (e.g., 214-1, 214-2, 214-3, 113-1, and 214-*h*) that operate in a multi-path environment. Field units A-C and E are non-legacy wireless devices that are capable of making a gross phase shift of the common code for transmission in the reverse link and also capable of including a unique orthogonal code in transmitted reverse link signals to distinguish the reverse link signals from the reverse link signals of other non-legacy subscriber units. Field unit D is a legacy wireless device that does not support a unique orthogonal code in the reverse link signal nor support gross phase shifts of the common code.

When the reverse link signals of the non-legacy field units A-C and E are in orthogonal alignment and, thus, appearing as a single field unit but distinguished based on the unique orthogonal codes, the timing of each of the reverse links is aligned at a common alignment time 610. However, in the case of multi-path for a given field unit, where multiple reverse link signals transmitted by the given field unit are received at the base station 120 and identified by the same unique orthogonal code (e.g., Walsh code as described in reference to FIG. 1), the base station 120 can select one of the multiple reverse link signals for alignment at the common alignment time 610.

For example, continuing to refer to FIG. 6, field unit A has the same reverse link signal received by the BSP 220 at two points in time, as indicated by tick marks 615 and 615'. In this embodiment, for the received field unit A reverse link signal represented by a tick mark, an offset time and signal metric is determined by the correlator 510 (FIG. 5). Based on the signal metric, the selector 515 determines which of the two reverse link signals 615, 615' is to be aligned with the reverse link signals of the other field units in the same group (i.e., field units B, C, and E) at the common orthogonal alignment time 610. In the case of field unit A in this example, the reverse link signal 615 closer to the common orthogonal alignment time 610 is selected for use by the BSP 220 based on the signal metric. Therefore, the BSP 220 issues a gross timing offset 417 that corresponds to the offset time to bring the selected reverse link signal 615 into orthogonal alignment at the common orthogonal alignment time 610. Field unit A shifts the phase of the common long code to align with the reverse link signals of field units B, C, and E. Naturally, the other received reverse link signal 615' from field unit A shifts by the same amount due to the long orthogonal code phase shift.

Field unit B is in alignment at the orthogonal alignment time 610 and, as determined by the single tick mark along its timeline, is not within a multi-path environment. Therefore, the BSP 220 need not make a decision as to whether a non-aligned received reverse link signal has a higher metric nor does the BSP 220 need to feed back a timing offset to the field unit B.

Field unit C is another field unit that is within a multi-path environment 400. In the case of field unit C, the selector 515 at the BSP 220 determines that the received reverse link signal 625 that is in alignment with the reverse links of other field units has a less desirable metric than the non-aligned reverse link signal 625'. It should be understood that the non-aligned reverse link signal 625' may be the reverse link signal that travels in the primary path or secondary path. In either case, the BSP 220 sends a gross timing offset 417 used to shift the long code to align the second reverse link signal 625' at the common orthogonal alignment time 610. The other received reverse link signal 625 is therefore shifted out of orthogonal alignment.

Field unit D is a legacy field unit and its reverse link signal is not brought into alignment with the non-legacy field units A-C and E. Were the reverse link from field unit D brought into alignment with the reverse links of the other field units, destructive interference may result because field unit D does not include the unique orthogonal code, as in the case of the non-legacy field units A-C and E. Since it is a legacy field unit, it should have its own unique long code phase offset nowhere near (in time) to the non-legacy field units A-C and E.

In the case of field unit E, its reverse link signal is aligned in common alignment time 610 and not affected by a multi-path environment; therefore, no timing adjustment is made to this reverse link signal.

FIG. 7 is a flow diagram of processes 700 and 765 executed by the BSP 220 and Subscriber Access Unit (SAU) 214-1, respectively, in accordance with the foregoing description. In this embodiment, the SAU 214-1 process 765 starts (step 745) and transmits a reverse link signal with common long code and unique orthogonal codes (step 750) to the BSP 220. In a multi-path environment 400, a primary path 405 and secondary path(s) 405', which may be caused by natural or man-made structures, are paths along which reverse link signals 410, 410' travel to the BSP 220.

The BSP process 700 starts (step 705) and receives the reverse link signals 410, 410' (step 710). The BSP process 710 associates metrics (step 715) with each of the received reverse link signals 410, 410'. Based on the metrics, the BSP process 700 selects a "best" reverse link signal (step 720) from among the reverse link signals received from the SAU 214-1 in each of the primary and secondary paths 405, 405'.

The BSP process 700 determines (step 725) whether the selected reverse link signal is orthogonally aligned (see FIG. 6) with reverse link signals from other subscriber units using the common long code. If the best reverse link signal 720 from the SAU 214-1 is orthogonally aligned, the BSP process 700 ends (step 740) without sending timing adjustment information back to the SAU 214-1, or sending a zero phase shift in an alternative embodiment. If the best reverse link signal is not orthogonally aligned with reverse link signals of other subscriber units using the common long code, the BSP process 700 determines a gross timing offset (step 730) and transmits the gross timing offset (step 735) to the SAU 214-1.

Receipt of the gross timing offset 417 by the SAU 214-1 process 765 causes the SAU 214-1 to make a coarse phase adjustment of the common long code in the reverse link signal (step 755). The SAU process 765 may end (step 760) or may continue (not shown) to receive gross or fine timing offsets from the BTS 120, as discussed in reference to FIG. 5.

It should be understood that the processes described herein may be implemented in hardware, firmware, or software. In the case of being implemented in software, the software may be stored on a computer-readable medium, such as RAM, ROM, CD-ROM, magnetic or optical disk, or other computer-readable medium. The software is loaded from the memory and executed by a processor, such as a general or special purpose processor, that operates in the BSP 220 and optionally in the BTS 120. Similarly, processes implemented in software in a subscriber unit are stored on a computer-readable medium and executed by a processor operating therein.

It should also be understood that a single user in the second group 210 may use more than one unique orthogonal (Walsh) code. For example, the user may have a significant payload to deliver to the BSP 220, so the user may use two channels, each identified with the user based on the unique orthogonal code. Also, in other embodiments or network environments, the long code may be a short code, orthogonal code, or other code that can be used for similar purposes as the long code described above.

Further, it should also be understood that the present invention applies to other wireless networks as long as similar processing described herein, with respect to reverse links utilizing an orthogonal structure, is used.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for receiving reverse link signals from a plurality of subscriber units comprising:
a receiver that receives a first plurality of reverse link signals and a second plurality of reverse link signals in a time interval, wherein each said reverse link signal of the first plurality of reverse link signals is derived from at least a common pseudo noise (PN) sequence and unique orthogonal sequence and each said reverse link signal of the second plurality of reverse link signals is derived from a unique pseudo noise (PN) sequence, wherein each said reverse link signal of the first plurality of reverse link signals is sent by a subscriber unit when not actively transmitting user data; and
a timing controller that determines a timing offset associated with at least one reverse link signal to align a timing of the at least one reverse link signal with reverse link signals from other subscriber units, wherein the one reverse link signal is at least one of the first plurality of reverse link signals or the second plurality of reverse link signals.

2. The apparatus according to claim 1 wherein the timing controller determines a fine timing offset and causes a fine phase adjustment of the common pseudo noise (PN) sequence of the reverse link signal.

3. The apparatus according to claim 1 wherein the timing controller provides the gross timing offsets to a subscriber unit in the form of a timing command.

4. The apparatus according to claim 1 wherein the timing controller provides the gross timing offsets to a subscriber unit in the form of a timing report.

5. The apparatus according to claim 1 further including a power controller that determines a power level of the aligned reverse link signal and provides feedback of the power level to a subscriber unit.

6. The apparatus according to claim 5 wherein the power controller provides the power level to the subscriber unit in the form of a power command.

7. The apparatus according to claim 5 wherein the power controller provides the power level to the subscriber unit in the form of a power report.

8. A method of receiving reverse link signals from a plurality of subscriber units comprising:
receiving a first and a second plurality of reverse link signals in a time interval, wherein each reverse link signal of the first plurality of reverse link signals is derived from a common pseudo noise sequence and a unique orthogonal sequence and each reverse link signal of the second plurality of reverse link signals is derived from a unique pseudo noise sequence, wherein each said reverse link signal of the first plurality of reverse link signals is sent by a subscriber unit when not actively transmitting user data; and
determining a timing offset associated with at least one reverse link signal to align the at least one reverse link signal with reverse link signals from other subscriber units, wherein the one reverse link signal is at least one of the first plurality of reverse link signals or the second plurality of reverse link signals.

9. The method according to claim 8 further including providing gross timing offsets to a subscriber unit in a form of a timing command.

10. The method according to claim 8 further including providing the gross timing offsets to a subscriber unit in a form of a timing report.

11. The method according to claim 8 further including determining a power level of the aligned reverse link signal and providing feedback of the power level to a subscriber unit.

12. The method according to claim 11 wherein providing the power level to send to the subscriber unit includes transmitting the power level feedback to the subscriber unit in the form of a power command.

13. The method according to claim 11 wherein providing the power level to send to the subscriber unit includes transmitting the power level feedback to the subscriber unit in the form of a power report.

14. A subscriber unit comprising:
at least one processor configured to receive a timing offset, wherein the at least one processor is further configured to transmit a reverse link signal derived from a common pseudo noise sequence and a unique orthogonal sequence;
wherein a timing of the reverse link signal is adjusted in response to the received timing offset; and
wherein the common pseudo noise sequence and different unique orthogonal sequences are used by a first plurality of other subscriber units in a same time interval for reverse link transmissions and unique different pseudo noise sequences are used by a second plurality of other subscriber units in the same time interval for reverse link transmissions, wherein each said reverse link signal is sent by a first plurality of subscriber units when not actively transmitting user data.

15. The subscriber unit of claim 14, wherein the at least one processor is configured to transmit a reverse link signal derived from the common pseudo noise sequence and the unique orthogonal sequence and is also configured to transmit a reverse link signal derived from a unique pseudo noise sequence.

* * * * *